(12) United States Patent
Connell et al.

(10) Patent No.: US 12,065,009 B2
(45) Date of Patent: Aug. 20, 2024

(54) BEARING ASSEMBLY FOR A WHEEL UNIT

(71) Applicant: Joy Global Underground Mining LLC, Warrendale, PA (US)

(72) Inventors: Alex Connell, Polk, PA (US); Chris Stewart, Oil City, PA (US)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 0 days.

(21) Appl. No.: 17/896,999

(22) Filed: Aug. 26, 2022

(65) Prior Publication Data

US 2023/0061119 A1 Mar. 2, 2023

Related U.S. Application Data (60) Provisional application No. 63/237,935, filed on Aug. 27, 2021.

(51) Int. Cl.
*B60G 3/20* (2006.01)

(52) U.S. Cl.
CPC .......... *B60G 3/20* (2013.01); *B60G 2200/144* (2013.01); *B60G 2200/422* (2013.01); *B60G 2200/44* (2013.01); *B60G 2204/416* (2013.01); *B60G 2300/026* (2013.01)

(58) Field of Classification Search
CPC ............... B60G 3/20; B60G 2200/144; B60G 2200/422; B60G 2200/44; B60G 2204/416; B60G 2300/026
See application file for complete search history.

(56) References Cited

U.S. PATENT DOCUMENTS

| | | | | |
|---|---|---|---|---|
| 2,357,742 A | * | 9/1944 | Jeffrey | B60K 17/30 |
| | | | | 180/242 |
| 2,381,672 A | | 8/1945 | Lee | |
| 5,820,150 A | * | 10/1998 | Archer | F16F 1/38 |
| | | | | 280/124.141 |
| 6,402,169 B1 | * | 6/2002 | Schafer | B62D 7/18 |
| | | | | 280/124.136 |
| 6,761,234 B1 | | 7/2004 | Lamela et al. | |
| 8,220,812 B2 | | 7/2012 | Sandri et al. | |
| 9,643,527 B2 | | 5/2017 | Uranaka et al. | |
| 10,124,639 B2 | * | 11/2018 | Bonera | B60G 7/008 |
| 10,399,437 B2 | * | 9/2019 | Ruscak | F16H 1/28 |
| 10,793,181 B2 | * | 10/2020 | Bennett | B60G 3/20 |
| 11,628,722 B2 | * | 4/2023 | Rasa | B62D 33/0207 |
| | | | | 180/356 |
| 2021/0245599 A1 | | 1/2021 | Li et al. | |

FOREIGN PATENT DOCUMENTS

CN 203157713 U 8/2013
EP 1574382 A2 9/2005

* cited by examiner

*Primary Examiner* — Jason D Shanske
*Assistant Examiner* — Matthew James O'Neill
(74) *Attorney, Agent, or Firm* — Husch Blackwell LLP (57) ABSTRACT

A suspension system for a wheel of a vehicle includes a first arm, a second arm, a support structure positioned between the first arm and the second arm, a first bearing assembly coupled to the first arm and supporting the support structure for movement, and a second bearing assembly coupled to the second arm and supporting the support structure for movement. The support structure is configured to be coupled to the wheel that is rotatable about a wheel rotation axis. The first bearing includes a spherical bearing, and the second bearing assembly includes a first spherical bearing and a second spherical bearing.

22 Claims, 11 Drawing Sheets

BEARING ASSEMBLY FOR A WHEEL UNIT

CROSS-REFERENCE TO RELATED APPLICATION

This application claims the benefit of prior-filed, co-pending U.S. Provisional Patent Application No. 63/237,935, filed Aug. 27, 2021, the entire contents of which are incorporated by reference.

TECHNICAL FIELD

The present disclosure relates to a wheel unit, and in particular to, a bearing assembly configured to support a transmission assembly and a hub assembly of the wheel unit.

Mining vehicles (e.g., haulage vehicles) include a wheel unit with upper and lower arms that support a transmission assembly and a hub assembly of the wheel unit. The transmission assembly and hub assembly are supported between the upper and lower arms such that rotation of the hub assembly and transmission assembly is allowed relative to the support arms.

SUMMARY

In one independent aspect, a suspension system for a wheel of a vehicle includes a first arm, a second arm, a support structure positioned between the first arm and the second arm, a first bearing assembly coupled to the first arm and supporting the support structure for movement, and a second bearing assembly coupled to the second arm and supporting the support structure for movement. The support structure is configured to be coupled to the wheel that is rotatable about a wheel rotation axis. The first bearing includes a spherical bearing, and the second bearing assembly includes a first spherical bearing and a second spherical bearing.

In another independent aspect, a suspension system for a wheel of a vehicle includes a first arm configured to be coupled to a chassis, a second arm configured to be coupled to a chassis, a transmission positioned between the first arm and the second arm, a first bearing assembly coupled to the first arm and supporting the transmission for movement about a pivot axis, and a second bearing assembly coupled to the second arm and supporting the transmission for movement. The transmission is configured to be coupled to the wheel that is rotatable about a wheel rotation axis, and the transmission includes a gear drive for transmitting an input torque to the wheel. The first bearing includes a spherical bearing supporting the transmission with respect to loads exerted in a first direction parallel to the pivot axis. The second bearing assembly includes a first spherical bearing and a second spherical bearing. The first spherical bearing supports the transmission with respect to loads exerted in the first direction, and the second spherical bearing supports the transmission with respect to loads exerted in a second direction opposite the first direction.

Other aspects will become apparent by consideration of the detailed description and accompanying drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings, whether direct or indirect.

Figure 1:
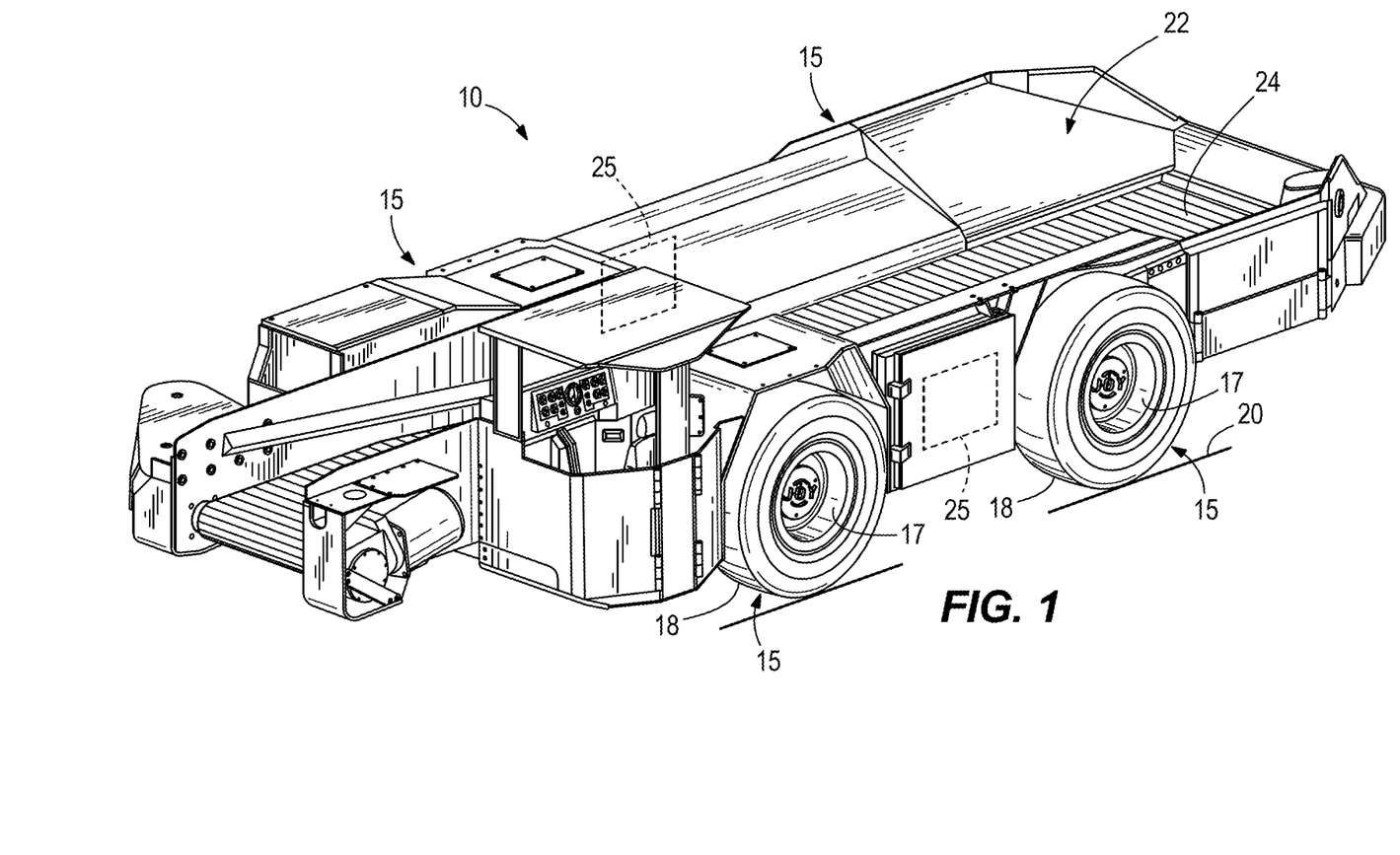
FIG. 1 is a perspective view of a haulage vehicle.

FIG. 1 illustrates a vehicle 10 including a plurality of wheel units 15 configured to support and move the vehicle 10 relative to a surface 20. In the illustrated embodiment, the vehicle 10 is a haulage vehicle (e.g., a shuttle car) and includes a bed 22 configured to receive material (e.g., coal, dirt, rock, etc.) for transportation in a mining operation. The bed 22 may include a conveyor 24. In other embodiments, however, the vehicle 10 may be a different type of vehicle (e.g. a construction vehicle, an agricultural vehicle, a forestry vehicle, etc.). The illustrated vehicle 10 includes one or more prime movers 25 (e.g., an electric motor) drivably coupled to four wheel units 15. In particular, each prime mover 25 is coupled to a pair of wheel units 15 located on respective left or right sides of the vehicle 10. In other embodiments, the vehicle may include fewer or more prime movers, and/or fewer or more wheel units, and the prime movers may drive the wheel units in a different configuration. In some embodiments, the vehicle may include one prime mover drivably coupled to all four wheel units. Also, in some embodiments, the prime mover(s) may be internal combustion engines.

Figure 2:
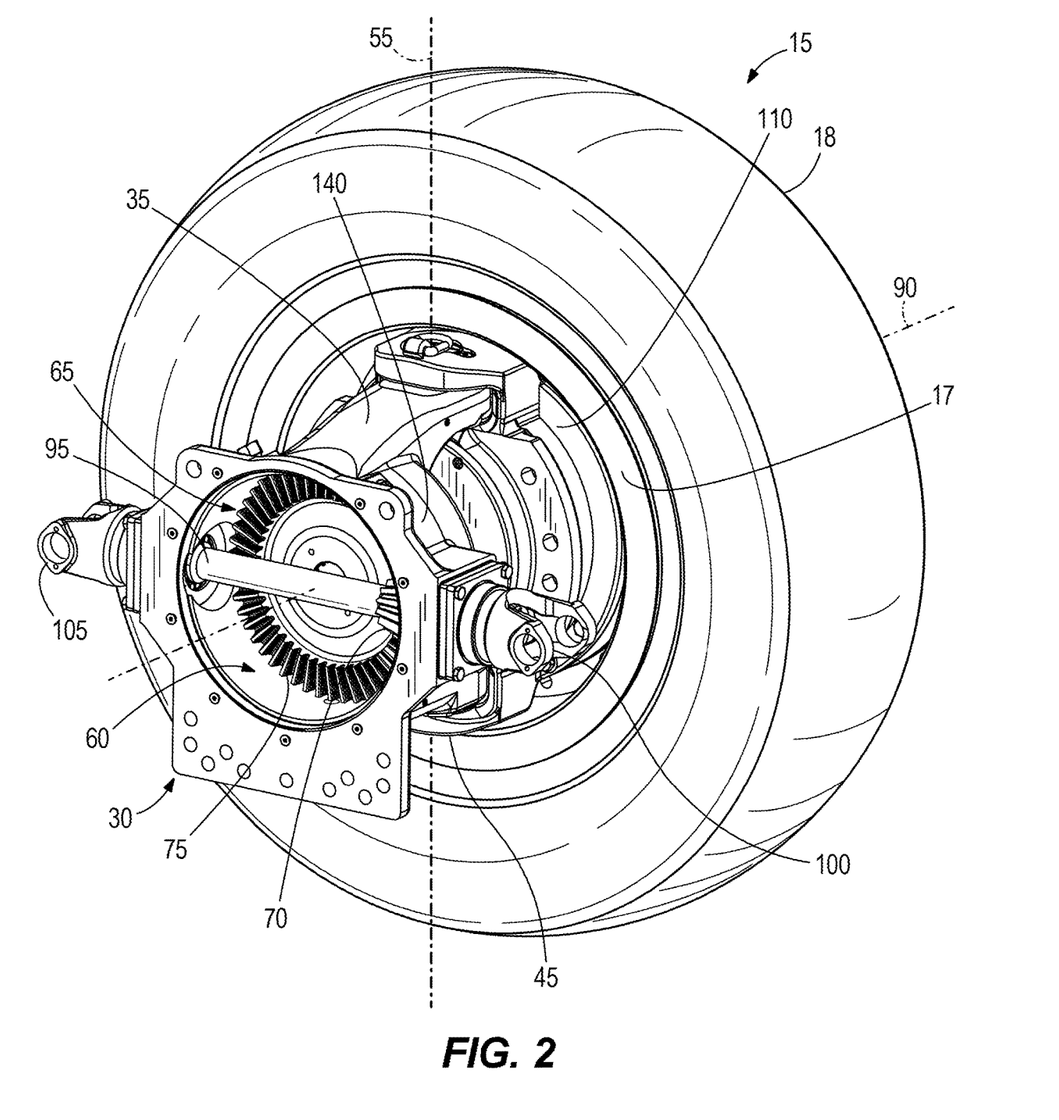
FIG. 2 is a rear perspective view of a wheel unit.
Figure 3:
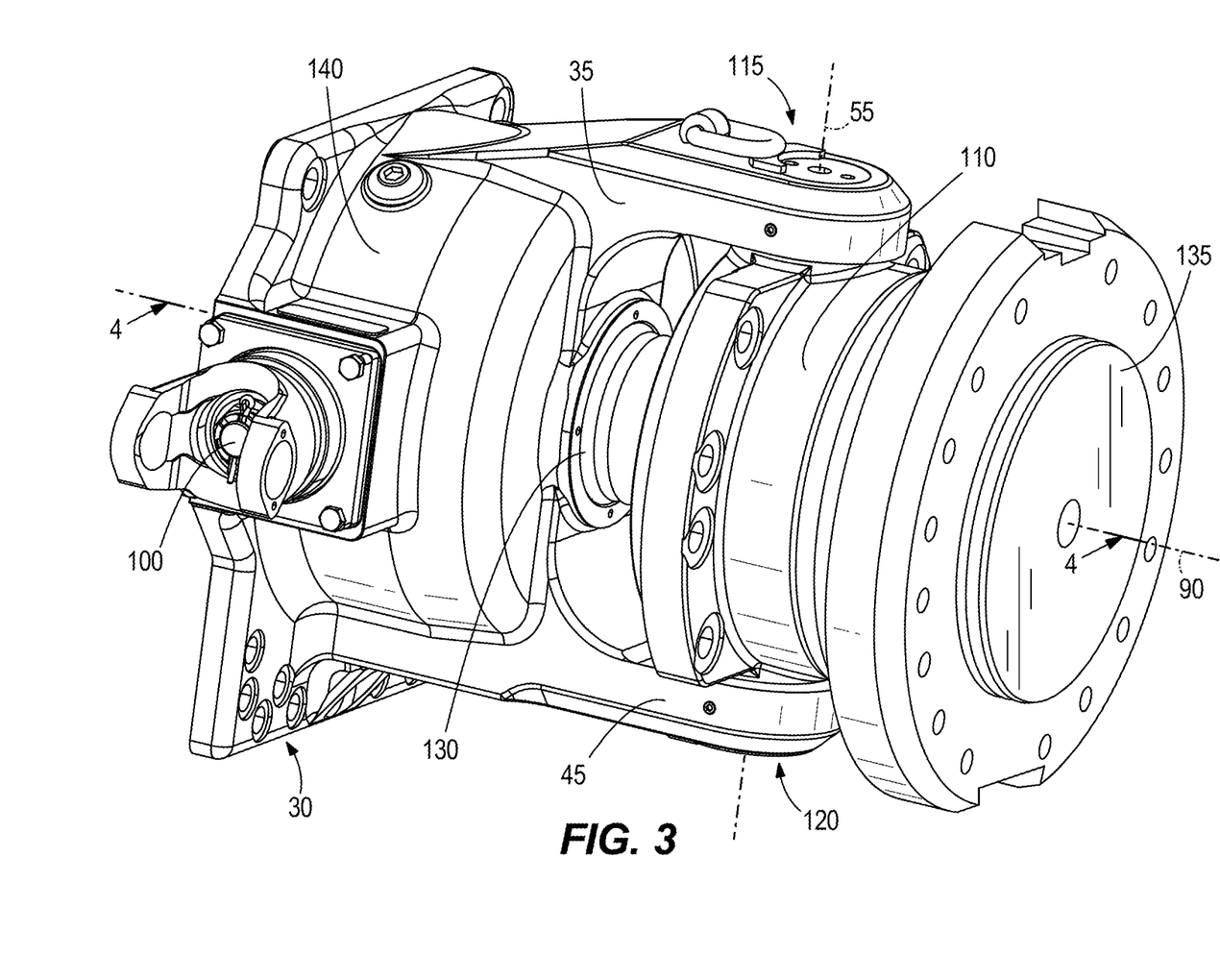
FIG. 3 is a front perspective view of the wheel unit of FIG. 2 with a wheel and tire removed.

The wheel unit 15 includes a suspension system 30 affixed to a chassis of the vehicle 10. As shown in FIG. 2, the suspension system 30 includes an upper arm 35 supporting an upper bearing assembly 115 (FIG. 3), and a lower arm 45 supporting a lower bearing assembly 120 (FIG. 3). In the illustrated embodiment, the upper bearing assembly 115 and the lower bearing assembly 120 are aligned along a steering axis 55 (FIGS. 2-4) extending between the upper bearing assembly 115 and the lower bearing assembly 120. The illustrated suspension system 30 also includes a bevel gear housing 140 including a bevel gear assembly 65 positioned in a cavity 60. The bevel gear assembly 65 includes a first bevel gear 70 and a second bevel gear 75. The wheel unit 15 includes a wheel rim 17 and a tire 18 supported on the rim 17, and the rim 17 is rotatable about a rotation axis 90. In the illustrated embodiment, the tire 18 supports the vehicle 10 on the surface and provides traction for moving the vehicle 10.

The first bevel gear 70 is enmeshed with the second bevel gear 75 and is driven by an input driveshaft 95. In the illustrated embodiment, one end of the driveshaft 95 is coupled to a first yoke 100 proximate from a first side of the suspension system 30, and another end of the driveshaft 95 is coupled to a second yoke 105 proximate a second side of the suspension system 30 opposite the first side. The first yoke 100 and second yoke 105 are configured to be coupled with either the electric motor 25 or another wheel unit 15. For example, in one configuration, the first yoke 100 is drivingly coupled to an output of the electric motor 25 and the second yoke 105 is drivingly coupled to a corresponding first yoke 100 on a second wheel unit 15. Stated another way, in such a configuration, the bevel gear assembly 65 is driven by the electric motor 25 coupled to either the first yoke 100 or the second yoke 105, while the other yoke transmits torque to another wheel unit 15.

Figure 4:
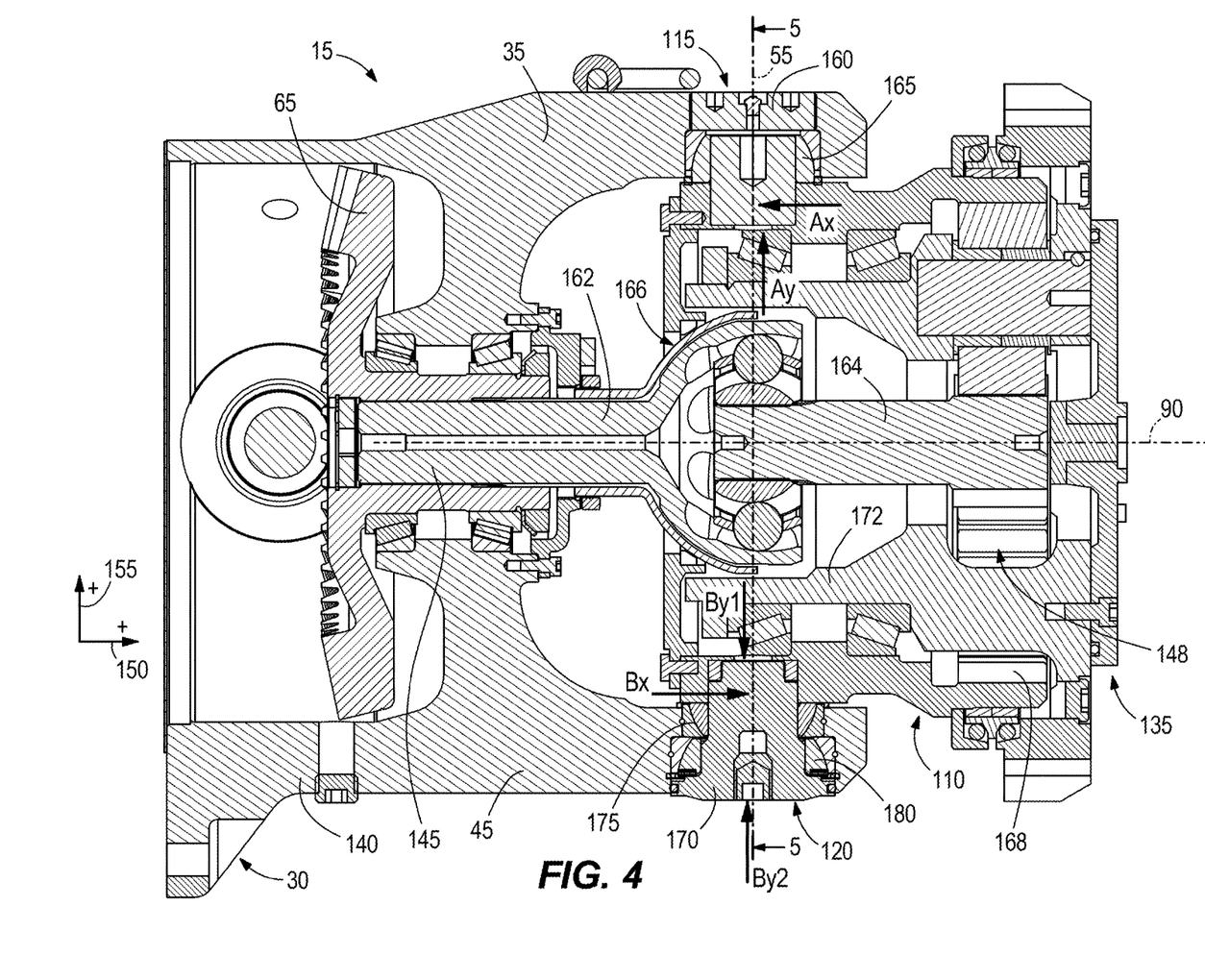
FIG. 4 is a cross sectional view of the wheel unit of FIG. 3, viewed along section 4-4.

As shown in FIGS. 3 and 4, a support structure is supported for pivoting movement about the steering axis 55. The support structure may include a transmission housing 110 (i.e., a pivot housing) and a transmission 148. In the illustrated embodiment, the steering axis 55 is perpendicular to the rotational axis 90 and the input driveshaft 95 (FIG. 2). As shown in FIG. 4, an upper bearing assembly 115 (e.g., an upper kingpin assembly) supports an upper pin 160 (e.g., an upper kingpin) that may extend at least partially through an upper aperture of the transmission housing 110 and an aperture of the upper arm 35. A lower bearing assembly 120 supports a lower pin 170 (e.g., a lower kingpin) that may extend at least partially through an aperture of the transmission housing 110 and an aperture of the lower arm 45. In the illustrated embodiment, the upper and lower pins 160, 170 are concentric with the steering axis 55. The upper bearing assembly 115 supports the upper pin 160 against both axial forces (Ay) exerted parallel to the steering axis 55 (e.g., in a positive y-direction 155 or vertical direction as shown in FIG. 4) and against radial forces (Ax) exerted perpendicular to the steering axis 55 (e.g., along an x-direction 150 or horizontal direction as shown in FIG. 4). The lower bearing assembly 120 supports the lower pin 170 against both axial forces (By1, By2) exerted parallel to the steering axis 55 (e.g., in both the positive y-direction 155 and a negative y-direction) and against radial forces (Bx) exerted perpendicular to the steering axis 55 (e.g., in a horizontal direction). As explained in greater detail below, the transmission housing 110 pivots relative to the upper arm 35 and the lower arm 45 in order to steer the vehicle 10.

As noted above, the electric motor 25 (FIG. 1) drives the bevel gear assembly 65. Referring to FIG. 4, the bevel gear assembly 65 rotates an output drive shaft 145 extending out of the bevel gear housing 140 via a drive shaft outlet. In some embodiments, the output drive shaft 145 may include a first shaft portion 162 and a second shaft portion 164 that is pivotable relative to first shaft portion 162. In the illustrated embodiment, the second shaft portion 164 may be coupled to the first shaft portion 162 by a ball-in-socket coupling 166. The rotation and torque exerted by the output drive shaft 145 is transmitted to a hub assembly 135 by the transmission 148 positioned within the transmission housing 110. In the illustrated embodiment, the transmission 148 may include a planetary gear drive 168 and a driven shaft 172 that is coupled to the hub assembly 135. The hub assembly 135 rotates about the rotational axis 90 and is coupled to the wheel rim 17 (FIG. 2).

Figure 5:
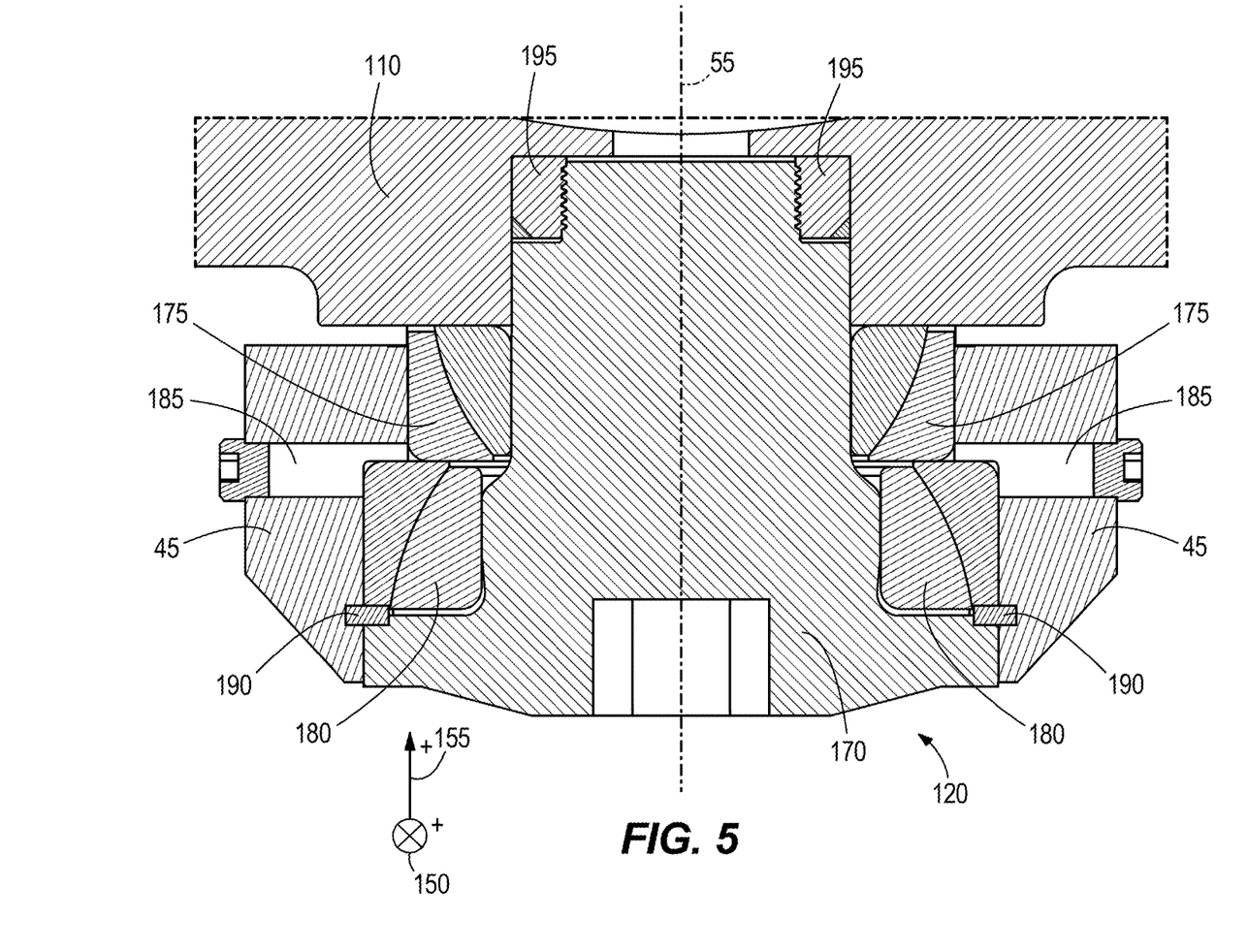
FIG. 5 is an enlarged cross sectional view of a lower bearing unit of the wheel unit of FIG. 4, viewed along section 5-5.

Referring now to FIG. 5, the lower bearing assembly 120 includes a first lower bearing 175 and a second lower bearing 180 that support the lower pin 170 against axial loading (e.g., in both a positive y-direction and negative y-direction as shown in FIG. 5), and also support the lower pin 170 against radial loads in any direction about the steering axis 55. In the illustrated embodiment, the first lower bearing 175 and second lower bearing 180 are each half spherical bearings. The second lower bearing 180 is positioned proximate an outermost end of the lower pin 170 (e.g., proximate a lower surface of the lower arm 45) and supports the lower 170 pin against axial loads exerted in the positive-y direction (e.g., inwardly toward the wheel rotational axis 90), while the first lower bearing 175 is positioned between the second lower bearing 180 and the wheel rotational axis 90 (FIG. 4) and supports the lower 170 pin against axial loads exerted in the negative-y direction (e.g., outwardly away from the wheel rotational axis 90). The upper bearing assembly 115 and lower bearing assembly 120 provide support for the heavy loads in the vehicle 10.

Unlike other wheel unit designs, in which heavy loads exerted on the vehicle may cause deflection of an upper arm, may increase stress on the upper arm, and may cause unseating of a lower bearing, the upper bearing assembly 115 and lower bearing assembly 120 are capable of withstanding heavy loading on the vehicle.

Referring to FIGS. 4 and 5, the lower bearing assembly 120 includes a lower pin 170 that is coupled to the transmission housing 110. In some embodiment, the lower pin 170 threadably engages a threaded surface positioned on the transmission housing 110 (e.g., a nut 195 welded to the transmission housing 110). The lower pin 170 extends through an aperture in the lower arm 45 and has a shaft portion and a head with a larger diameter than the shaft portion. The lower pin 170 via the head retains the lower first bearing 175 and the lower second bearing 180 against the transmission housing 110 and within the aperture of the lower arm 45.

Referring to FIG. 4, the first lower bearing 175 is a half-spherical bearing that supports the lower pin 170 and the transmission housing 110 against a radial load Bx and an axial load By1 (e.g., exerted in a negative y-direction 155). The second lower bearing 180 is a half-spherical bearing that supports the lower pin 170 and the transmission housing 110 against a radial load Bx and an axial load By2 (e.g., exerted in a positive y-direction 155). The shaft portion of the lower pin 170 is provided with a stepped circumference, such that the first lower bearing 175 partially distributes a load (e.g., in the negative y-direction) on the lower pin 170. The aperture of the lower arm 45 is provided with a stepped circumference, such that the lower second bearing 180 partially distributes a load (e.g., in the positive y-direction) on the lower arm 45. Thus, the lower bearing assembly 120 supports against axial loads exerted in both directions along the steering axis 55, and still supports rotational movement of the transmission housing 110 relative to the lower arm 45 about the steering axis 55.

In the illustrated embodiment, a snap ring 190 may extend radially about the aperture in the lower arm 45 and may be positioned between the lower pin 170 and the lower second bearing 180 to retain the first lower bearing 175 and the second lower bearing 180 prior to installation of the lower pin 170. Grease ports 185 may be provided on opposite sides of the lower arm 45 to provide access for lubrication of the first lower bearing 175 and the second lower bearing 180.

Various embodiments of lower bearing assemblies are shown in FIGS. 4-11, and aspects of one or more embodiments may be combined in other permutations of lower bearing assemblies not shown described herein.

Figure 6:
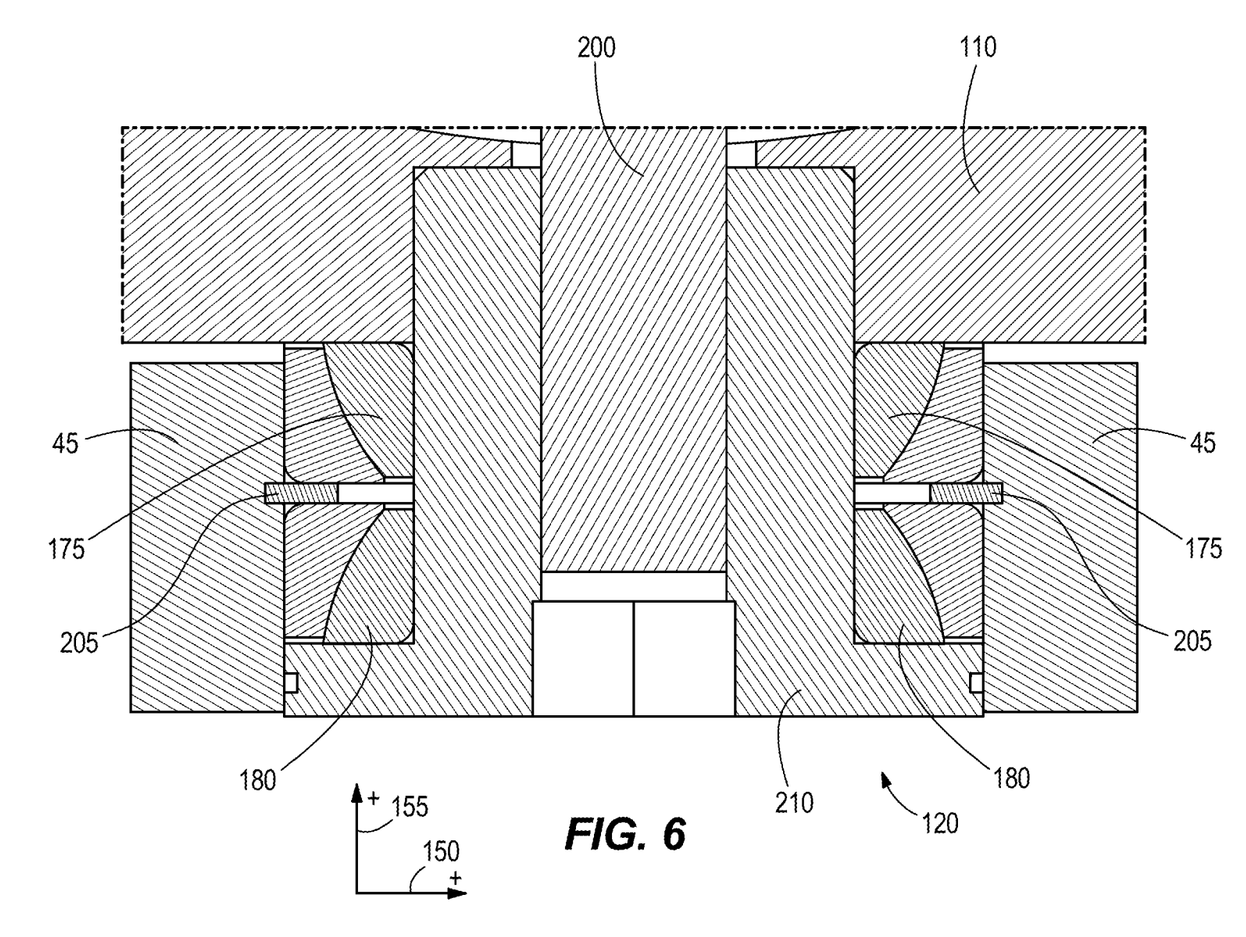
FIG. 6 is a cross sectional view of a lower bearing unit according to another embodiment.

Referring now to FIG. 6, in some embodiments, a lower pin 210 retains a first lower bearing and a second lower bearing 180 between a head of the lower pin 210 and the transmission housing 110. A threaded rod 200 may be secured (e.g., welded) to the transmission housing 110 and extend from the transmission housing 110 such that a shaft of the lower pin 210 can be threaded to the threaded rod 200. A retaining ring 205 may be positioned between the lower bearings 175, 180 and may extend at least partially into a radial cavity within an aperture of the lower arm 45. The retaining ring 205 thereby fixes the lower bearings 175, 180 against axial movement relative to the lower arm 45 (e.g., with respect to a y-direction as shown in FIG. 6).

Figure 7:
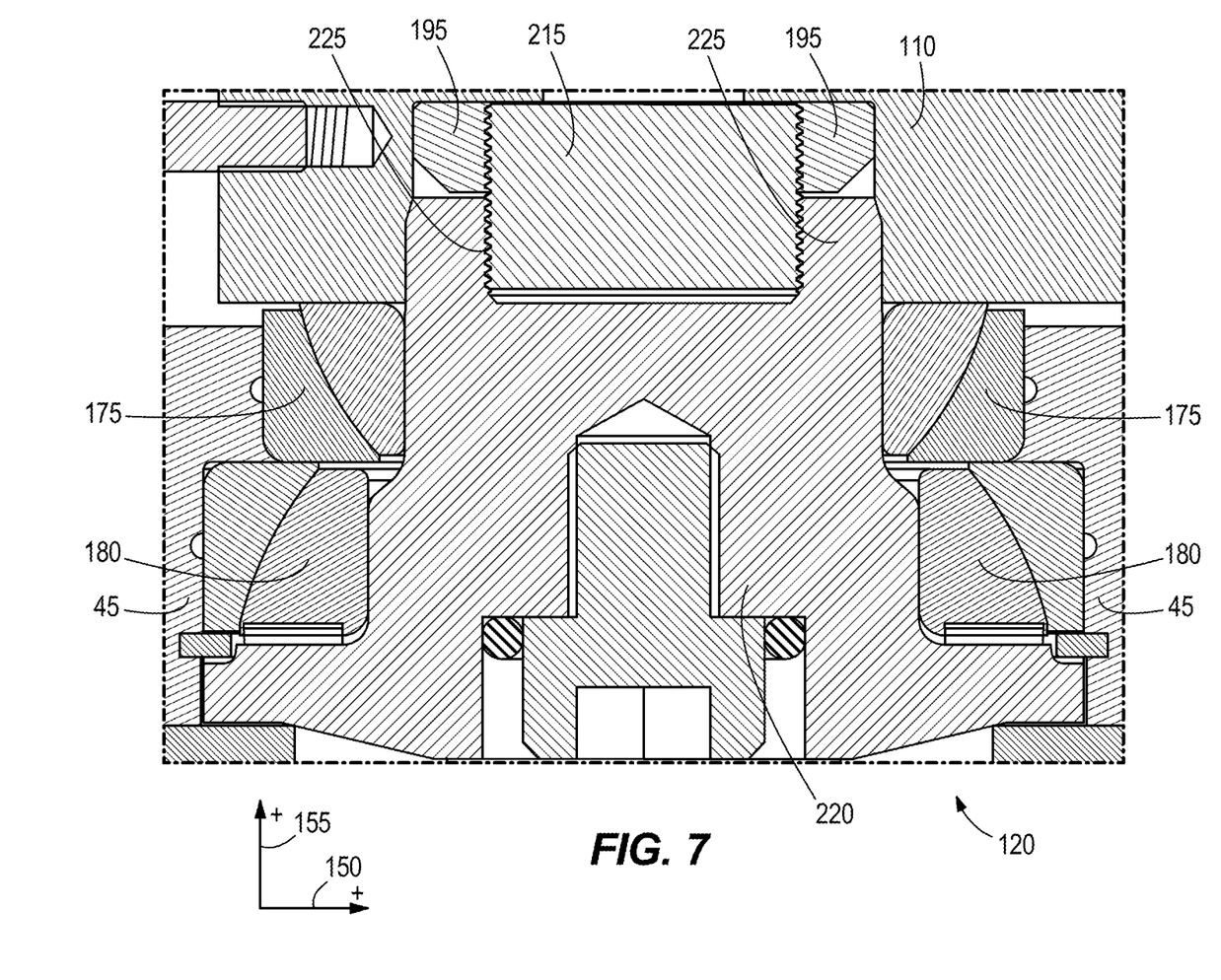
FIG. 7 is a cross sectional view of a lower bearing unit according to another embodiment.

Referring to FIG. 7, in some embodiments, a threaded bolt 215 may provide a connection between a lower pin 220 and the threaded surface secured to the transmission housing 110 (e.g., a welded nut 195). For example, a first end of the threaded bolt 215 may engage a threaded opening 225 of the lower pin 220, and a second end of the threaded bolt 215 may engage the welded nut 195.

Figure 8:
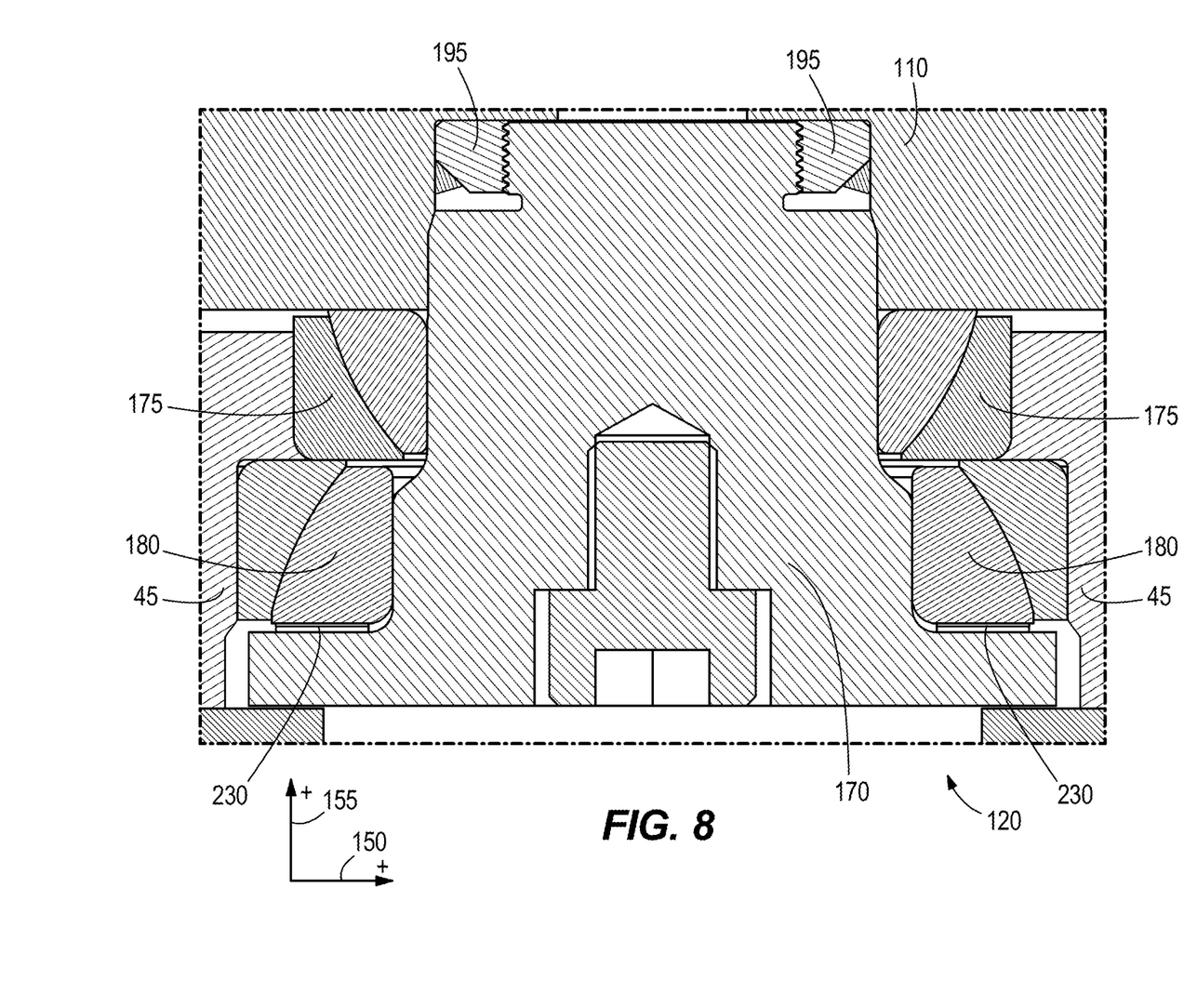
FIG. 8 is a cross sectional view of a lower bearing unit according to another embodiment.

Referring to FIG. 8, in some embodiments, shims 230 may be provided between the second lower bearing 180 and a bearing surface (e.g., the head) of the lower pin 170. The shims 230 adjust the position of the second lower bearing 180 to ensure proper alignment of the second lower bearing 180 relative to the lower arm 45 and the lower pin 170.

Figure 9:
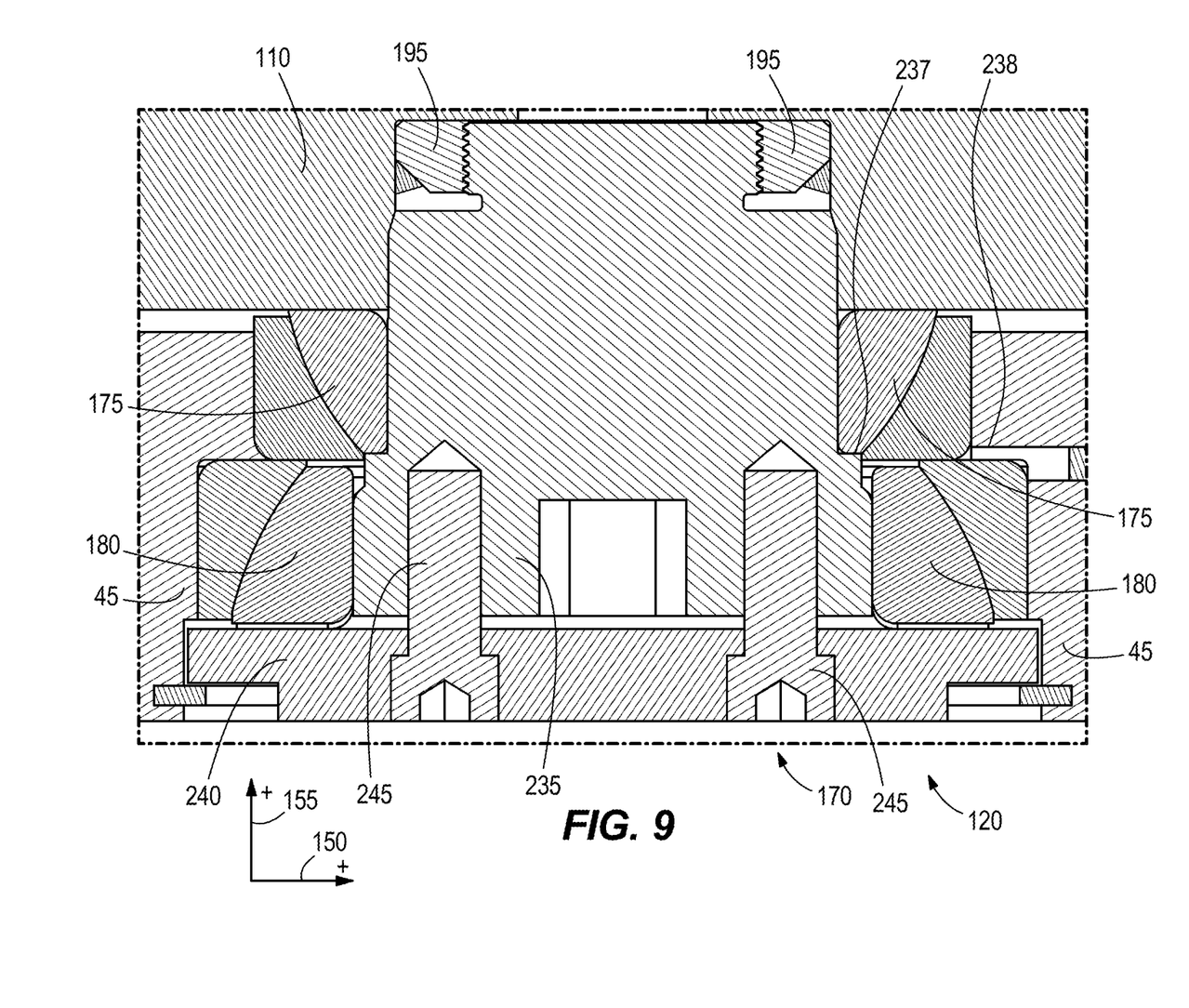
FIG. 9 is a cross sectional view of a lower bearing unit according to another embodiment.

Referring to FIG. 9, in some embodiments, the lower pin 170 may be constructed as two components including a lower pin center shaft 235 and a lower pin cap 240. The lower pin center shaft 235 includes a center shaft lip 237. The two-component design allows an operator to more easily install the lower pin 170, as the lower pin center shaft 235 can be first installed into the welded nut 195 to secure only the first lower bearing 175 between the center shaft lip 237 and the transmission housing 110. While first lower bearing 175 is fixed in its operational position, the second lower bearing 180 may be installed by positioning the second lower bearing between a lower arm lip 238 and the lower pin cap 240. The lower pin cap 240 is then held in place with two cap retaining bolts 245 that secure the lower pin cap 240 with respect to the lower pin center shaft 235, thereby fixing the second lower bearing 180 in its operational position. While only two cap retaining bolts 245 are shown, more or fewer pins can be used to secure the lower pin cap 240 with respect to the lower pin center shaft 235.

Figure 10:
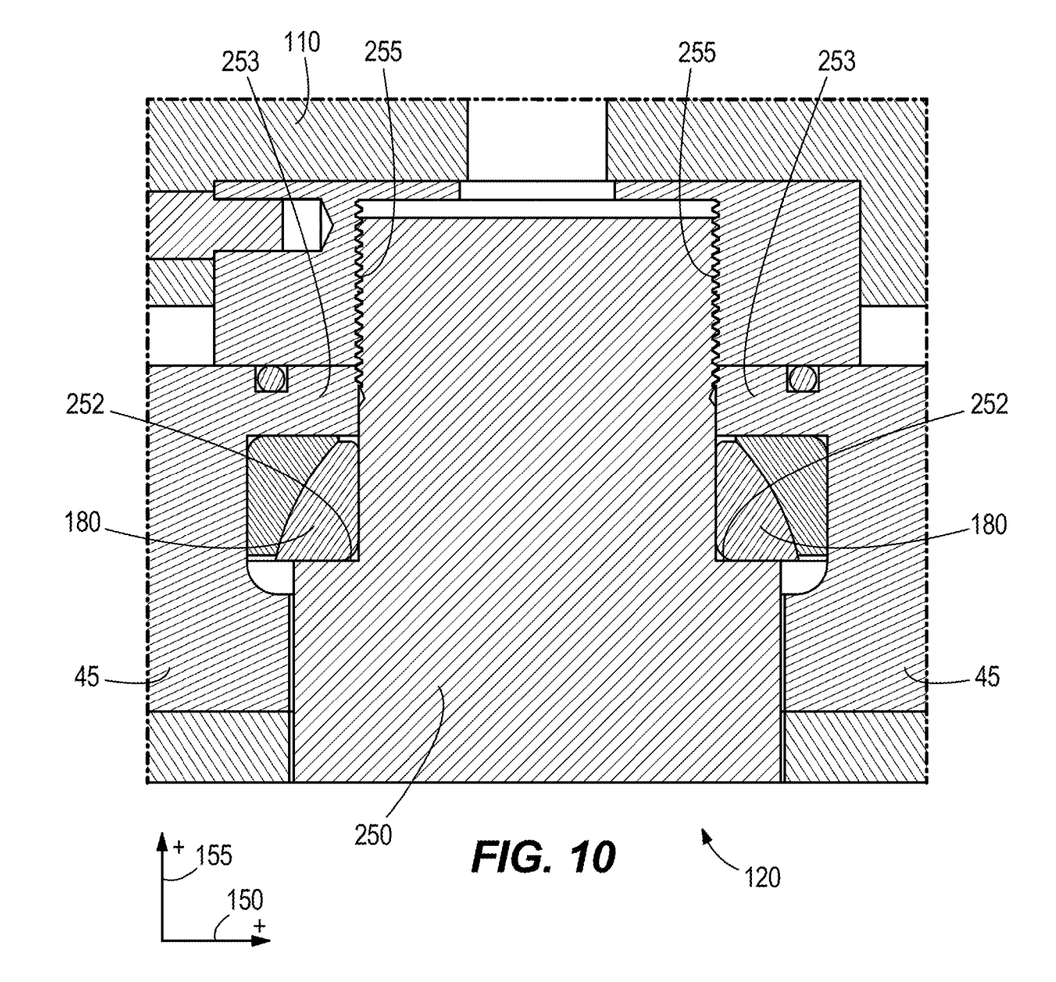
FIG. 10 is a cross sectional view of a lower bearing unit according to another embodiment.

In other embodiments, a lower bearing assembly 120 includes a single lower bearing 180. The embodiments shown in FIGS. 10 and 11 each include a single lower bearing 180 that is oriented to support against an axial load from the lower arm 45 (e.g., in a negative y-direction 155). Referring to FIG. 10, a lower pin 250 includes a lower pin lip 252 and is threadably secured into the transmission housing 110 via a transmission housing threaded portion 255. The lower pin 250 passes though the aperture in the lower arm 45 and retains the lower second bearing 180 against a lower arm lip 253 extending circumferentially around the aperture via the lower pin lip 252.

Figure 11:
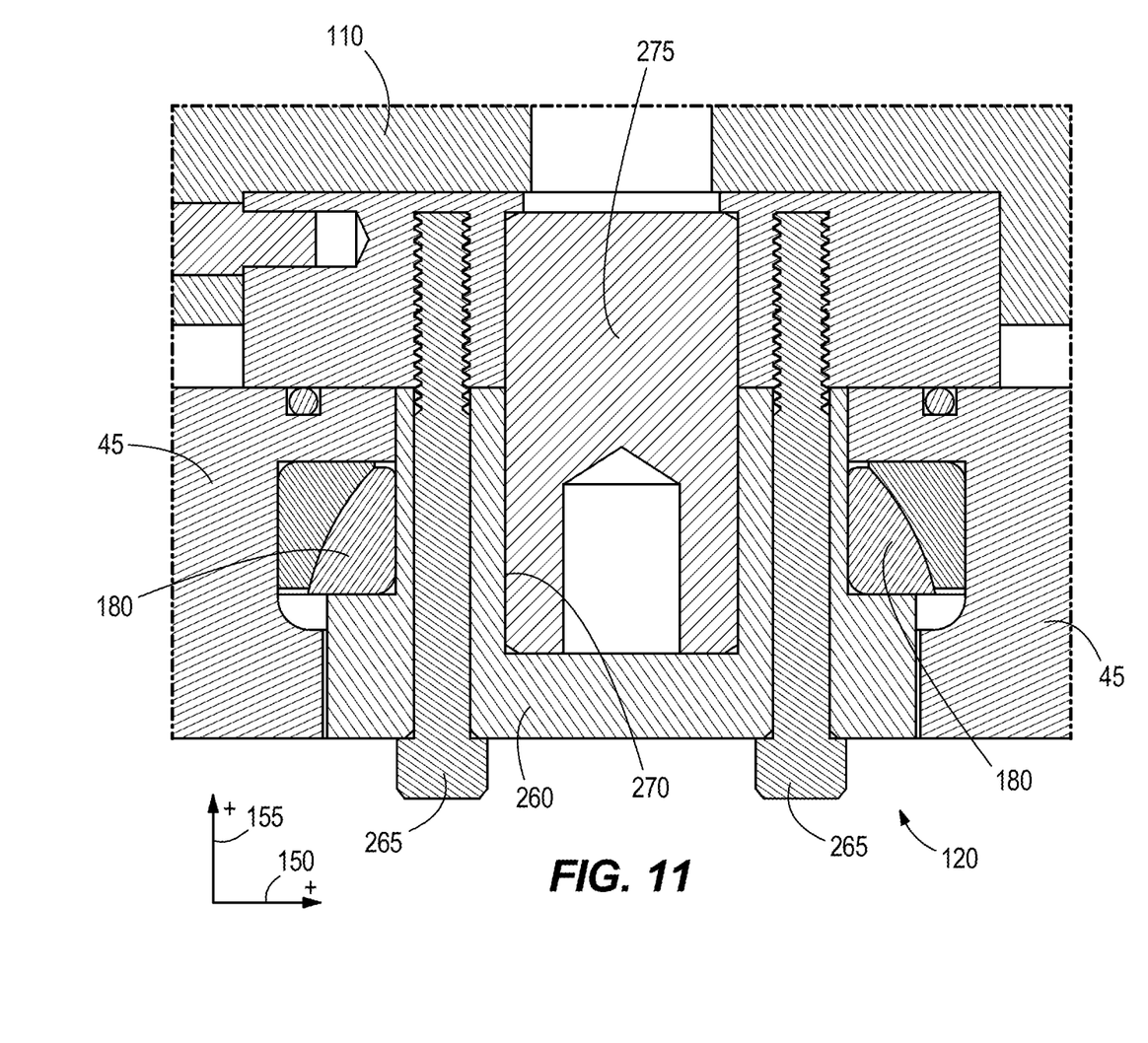
FIG. 11 is a cross sectional view of a lower bearing unit according to another embodiment.

In some embodiments, as shown in FIG. 11, a lower pin 260 is not threaded directly to the transmission housing 110. Instead, the lower pin 260 includes a bolt cavity 270 that receives an alignment extension 275 extending from the transmission housing 110. When the lower pin 260 is positioned on the alignment extension 275, bolts 265 extend through the lower pin 260 and into the transmission housing 110 to retain the lower pin 170 against the transmission housing 110, thus also retaining the lower second bearing 180 between the lower arm 45 and the lower pin 260.

Although the disclosure has been described in detail with reference to certain preferred embodiments, variations and modifications exist within the scope and spirit of one or more independent aspects as described. Various features and advantages are set forth in the following claims.

What is claimed:

1. A suspension system for a wheel of a vehicle, the suspension system comprising:
   a first arm;
   a second arm;
   a support structure positioned between the first arm and the second arm, the support structure configured to be coupled to the wheel that is rotatable about a wheel rotation axis;
   a first bearing assembly coupled to the first arm and supporting the support structure for movement, the first bearing assembly including a single spherical bearing; and
   a second bearing assembly coupled to the second arm and supporting the support structure for movement, the second bearing assembly including a first spherical bearing and a second spherical bearing;
   wherein the first spherical bearing of the second bearing assembly is a first half spherical bearing and the second spherical bearing is a second half spherical bearing, wherein the first half spherical bearing is positioned vertically above the second half spherical bearing, the first half spherical bearing supporting a housing relative to the second arm against loads exerted in a direction toward the first arm, the second half spherical bearing supporting the housing relative to the second arm against loads exerted in a direction away from the first arm.

2. The suspension system of claim 1, wherein the first bearing assembly and the second bearing assembly support the support structure for rotation relative to the first arm and the second arm about a steering axis perpendicular to the wheel rotation axis.

3. The suspension system of claim 1, wherein the vehicle includes a bed for hauling material and a conveyor for moving material positioned in the bed.

4. The suspension system of claim 1, further comprising a gear drive transmitting torque from a drive shaft to the wheel, the gear drive supported on the support structure.

5. The suspension system of claim 1, further comprising an output shaft, the output shaft configured to receive an input torque from a drive shaft and transmit the torque to the wheel, at least a portion of the output shaft supported on the support structure.

6. The suspension system of claim 5, wherein the output shaft includes a first portion and a second portion pivotably coupled to the first portion by a joint, the joint permitting pivoting movement of the second shaft portion with the wheel.

7. The suspension system of claim 1, wherein the spherical bearing of the first bearing assembly supports the housing relative to the first arm against loads exerted in a first direction parallel to a pivot axis, the first spherical bearing of the second bearing assembly supports the housing relative to the second arm against loads exerted in the first direction, and the second spherical bearing of the second bearing assembly supports the housing relative to the second arm against loads exerted in a second direction opposite the first direction.

8. The suspension system of claim 1, wherein the first arm is located vertically above the second arm.

9. The suspension system of claim 1, wherein a snap ring is positioned between the first and second bearings of the second bearing assembly.

10. The suspension system of claim 1, wherein the second bearing assembly includes a pin and an end plate, the end plate removably fastenable to the pin and threadably fastenable to the housing, the pin and the end plate retaining the first and the second bearings of the second bearing assembly in an aperture of the second arm.

11. The suspension system of claim 10, wherein the pin is bolted to the end plate.

12. The suspension system of claim 10, wherein the pin includes a first portion having a first diameter and a second portion having a second diameter different from the first diameter, a transition from the first portion to the second portion forms a lip, the lip configured to retain the first spherical bearing of the second bearing assembly against a first portion of the aperture in a direction parallel to a pivot axis.

13. The suspension system of claim 1, wherein the second bearing assembly further includes a pin for retaining the first spherical bearing and the second spherical bearing, wherein the pin is insertable into an opening of the second arm facing away from the first arm.

14. The suspension system of claim 12, wherein the end plate is configured to retain the second spherical bearing of the second bearing assembly against a second portion of the aperture in the direction parallel to the pivot axis, and the second portion of the aperture has a different diameter than the first portion of the aperture.

15. A suspension system for a wheel of a vehicle, the suspension system comprising:
    a first arm configured to be coupled to a chassis;
    a second arm configured to be coupled to a chassis;
    a transmission positioned between the first arm and the second arm, the transmission configured to be coupled to the wheel that is rotatable about a wheel rotation axis, the transmission including a gear drive for transmitting an input torque to the wheel;
    a first bearing assembly coupled to the first arm and supporting the transmission for movement about a pivot axis, the first bearing assembly including a single spherical bearing supporting the transmission with respect to loads exerted in a first direction parallel to the pivot axis; and
    a second bearing assembly coupled to the second arm and supporting the transmission for movement, the second bearing assembly including a first spherical bearing and a second spherical bearing, the first spherical bearing supporting the transmission with respect to loads exerted in the first direction, the second spherical bearing supporting the transmission with respect to loads exerted in a second direction opposite the first direction;
    wherein the first spherical bearing of the second bearing assembly is a first half spherical bearing and the second spherical bearing is a second half spherical bearing, wherein the first half spherical bearing is positioned vertically above the second half spherical bearing, the first direction oriented toward the first arm, the second direction oriented away from the first arm.

16. The suspension system of claim 15, wherein the pivot axis is oriented perpendicular to the wheel rotation axis.

17. The suspension system of claim 15, further comprising an output shaft, the output shaft configured to receive the input torque from a drive shaft, at least a portion of the output shaft supported between the first arm and the second arm.

18. The suspension system of claim 17, wherein the output shaft includes a first portion and a second portion pivotably coupled to the first portion by a joint, the joint permitting pivoting movement of the second shaft portion with the wheel.

19. The suspension system of claim 15, wherein the second bearing assembly include a pin extending through the first spherical bearing and the second spherical bearing, the pin removably coupled to the transmission.

20. The suspension system of claim 15, wherein the second bearing assembly includes a pin and an end plate, the end plate removably fastenable to the pin and threadably fastenable to a housing, the pin and the end plate retaining the first and the second bearings of the second bearing assembly in an aperture of the second arm.

21. The suspension system of claim 20, wherein the pin includes a first portion having a first diameter and a second portion having a second diameter different from the first diameter, a transition from the first portion to the second portion forms a lip, the lip configured to retain the first spherical bearing of the second bearing assembly against a first portion of the aperture in at least one of the first direction and the second direction.

22. The suspension system of claim 15, wherein the second bearing assembly further includes a pin for retaining the first spherical bearing and the second spherical bearing, wherein the pin is insertable into an opening of the second arm facing away from the first arm.

* * * * *